United States Patent
Leinenbach et al.

(10) Patent No.: US 12,123,856 B2
(45) Date of Patent: Oct. 22, 2024

(54) LC SYSTEM AND METHOD WITH COLUMN BACKFLUSHING

(71) Applicant: Roche Diagnostics Operations, Inc., Indianapolis, IN (US)

(72) Inventors: Andreas Leinenbach, Peissenberg (DE); Aart Pieter van Doorn, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 110 days.

(21) Appl. No.: 17/659,772

(22) Filed: Apr. 19, 2022

(65) Prior Publication Data
US 2022/0349863 A1 Nov. 3, 2022

(30) Foreign Application Priority Data

Apr. 30, 2021 (EP) .................................... 21171685

(51) Int. Cl.
*G01N 30/02* (2006.01)
*G01N 30/36* (2006.01)

(52) U.S. Cl.
CPC ....... *G01N 30/36* (2013.01); *G01N 2030/027* (2013.01)

(58) Field of Classification Search
CPC .............. G01N 30/36; G01N 2030/027; G01N 2030/402; G01N 30/40; G01N 2030/628; G01N 30/88; G01N 2030/8804; G01N 2030/8813; G01N 30/02
USPC ... 73/61.56, 863.72, 863.73, 864.83, 864.84; 422/70, 63, 67; 134/22.11, 22.12
See application file for complete search history.

(56) References Cited

U.S. PATENT DOCUMENTS

| | | | |
|---|---|---|---|
| 4,271,697 A | 6/1981 | Mowery, Jr. | |
| 6,641,783 B1 | 11/2003 | Pidgeon et al. | |
| 2010/0258487 A1* | 10/2010 | Zelechonok | G01N 30/40 210/108 |
| 2013/0206653 A1* | 8/2013 | Brann | B01L 3/545 210/198.2 |

(Continued)

FOREIGN PATENT DOCUMENTS

| | | |
|---|---|---|
| CN | 104111298 A * | 10/2014 |
| WO | 2000/045929 A1 | 8/2000 |
| WO | 2016/116544 A2 | 7/2016 |

OTHER PUBLICATIONS

European Search Report issued Sep. 30, 2021, in Application No. 21171685.7, 2 pp.

*Primary Examiner* — Robert R Raevis
(74) *Attorney, Agent, or Firm* — Taft Stettinius & Hollister LLP

(57) ABSTRACT

A liquid chromatographic (LC) system is herein disclosed, the LC system comprising at least one fluidic stream comprising at least one HPLC column, a downstream valve connected to the at least one fluidic stream and connectable to a detector via a valve-to-detector conduit, wherein the at least one fluidic stream is connectable to the valve-to-detector conduit via the downstream valve, and where the LC system further comprises a downstream pump fluidically connected to the downstream valve and connectable to the at least one fluidic stream via the downstream valve in order to backflush and thereby clean the at least one HPLC column. A respective automated LC method is herein also disclosed.

14 Claims, 10 Drawing Sheets

(56) References Cited

U.S. PATENT DOCUMENTS

2014/0017798 A1* 1/2014 Yu .................... G01N 30/06
                                                  436/131
2014/0305228 A1   10/2014 Witt et al.
2019/0374874 A1   12/2019 Cirou et al.

* cited by examiner

LC SYSTEM AND METHOD WITH COLUMN BACKFLUSHING

CROSS-REFERENCE TO RELATED APPLICATIONS

This application claims priority to European Patent Application No. 21171685.7, filed 30 Apr. 2021, the disclosure of which is hereby incorporated by reference in its entirety.

TECHNICAL FIELD

The present disclosure is related to an automated liquid chromatography system and method comprising liquid chromatographic column backflushing.

BACKGROUND

Automated in-vitro diagnostic analyzers are prevalent in clinical laboratories and hospital environments. These devices have become more and more complex due to added functionalities and increased sample throughput. Consequently, errors and malfunctions can occur in a multitude of device components, increasing the potential for decreased productivity of the analyzer and/or less reliable measurement results. In particular, there is a growing interest for the implementation of mass spectrometry and, more specifically, of liquid chromatography (LC) coupled to mass spectrometry in the clinical laboratory for in-vitro diagnostics use, which brings an additional level of complexity and technical challenges when it comes to automation.

The intense workload posed on some components of the system and particularly the LC system may require frequent maintenance procedures.

In particular, HPLC columns may undergo continuous deterioration of their performance as the number of sample injections increases, resulting, e.g., in increasing background, shifting of retention times, shortened column lifetime, increased costs, and need for frequent maintenance, mostly due to particulate build-up at the column head.

Backflushing an HPLC column can provide higher sample throughput, more uptime, less maintenance, lower costs, higher data quality, and longer lasting calibrations. This is typically done by manually disconnecting the column from the flow system and reconnecting the outlet side of the column to the flow inlet such as to reverse the flow direction through the column, whereas the flow out of the column is typically directed to waste in order not to contaminate the detector. This manual procedure may take 15-20 min or more for each column before the column is reconnected in the original orientation with the correct flow direction, followed by re-equilibration and quality control.

This manual procedure can be laborious, time consuming, and require the intervention of external service personnel or of skilled laboratory personnel, during which time an analyzer or component thereof might not be available for use, besides generating additional costs and introducing a risk of errors and malfunctions and even of system damage.

SUMMARY

Although the embodiments of the present disclosure are not limited to specific advantages or functionality, it is noted that the present disclosure provides an LC system and method, which enable, among other functions, automated HPLC column backflushing, thereby ensuring continued analytical performance of the system and extension of the HPLC column lifetime, without manual intervention and hence with increased user convenience. Other advantages are that system downtime is minimized, costs are reduced and risk of errors, malfunctions and system damage are eliminated.

In accordance with one embodiment, a liquid chromatographic (LC) system is provided comprising at least one fluidic stream comprising at least one HPLC column, a downstream valve connected to the at least one fluidic stream and connectable to a detector via a valve-to-detector conduit, wherein the at least one fluidic stream is connectable to the valve-to-detector conduit via the downstream valve. The LC system further comprises a downstream pump fluidically connected to the downstream valve and connectable to the at least one fluidic stream via the downstream valve in order to backflush and thereby clean the at least one HPLC column. The HPLC column is distinguished from rapid trap and elute LC columns.

In accordance with another embodiment, an automated LC method is provided comprising fluidically connecting at least one fluidic stream comprising at least one HPLC column, distinguished from rapid trap and elute LC columns, to a downstream valve in order to connect the at least one fluidic stream to a detector via a valve-to-detector conduit, the method further comprising fluidically connecting a downstream pump to the at least one fluidic stream via the downstream valve in order to backflush and thereby clean the at least one HPLC column.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1A:
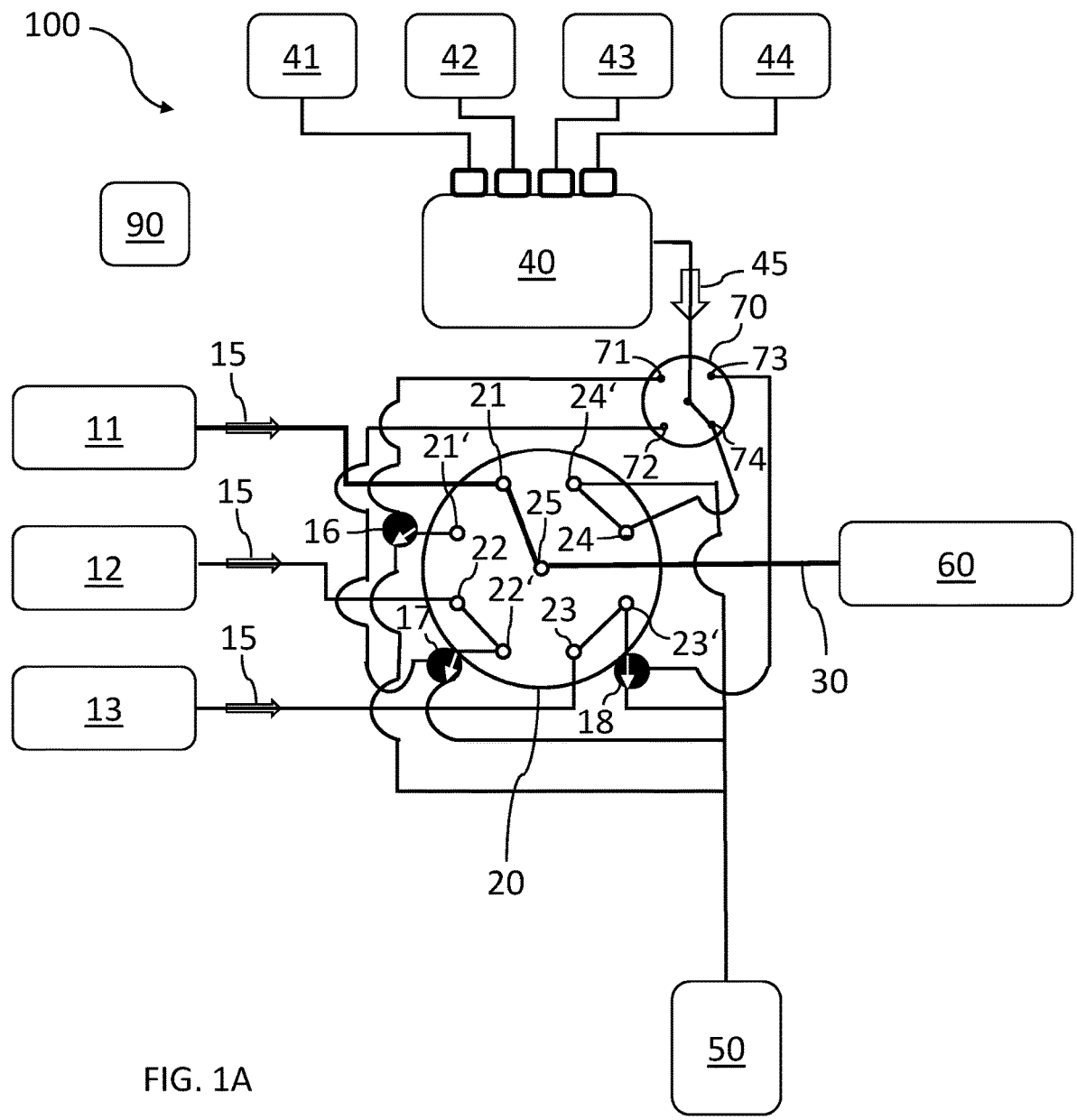
FIG. 1A shows schematically an LC system comprising a downstream pump connected to a downstream valve and a first step of an LC method comprising using the downstream pump.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

"Liquid chromatography or LC" is an analytical process that subjects samples injected by a sample injector to chromatographic separation through an LC column in order for example to separate analytes of interest from matrix components, e.g., remaining matrix components after sample preparation that may still interfere with a subsequent detection, e.g., a mass spectrometry detection, and/or in order to separate analytes of interest from each other in order to enable their individual detection. "High-performance liquid chromatography" or HPLC, "ultra-high-performance liquid chromatography" or UHPLC, "micro liquid chromatography" or μLC and "small-bore liquid chromatography" or small-bore LC are forms of liquid chromatography performed under pressure.

A "liquid chromatographic system or LC system" is an analytical apparatus or module or a unit in an analytical apparatus for carrying out liquid chromatography. The LC system may be embodied as a single channel with one fluidic stream or as a multi-channel system with a plurality of fluidic streams, comprising one or a plurality of LC columns arranged in parallel and/or in series. The LC system may also comprise elements such as a sample injector, valves, liquid sources, fluidic connections and parts, e.g., for mixing liquids, degassing liquids, tempering liquids, and the like, one or more sensors, such as pressure sensors, temperature sensors and the like, and especially at least one LC pump. The list is not exhaustive.

According to an embodiment, the detector can be a mass spectrometer connected to the valve-to-detector conduit via an ionization source. The detector may however be something other than a mass spectrometer, such as, i.e., an optical detector, e.g., a UV or fluorescence detector, an impedance detector, a conductivity detector and the like.

According to an embodiment, the LC system can be configured as an analytical module designed to prepare a sample for mass spectrometry and/or to transfer a prepared sample to a mass spectrometer, in particular for separating analytes of interest before detection by a mass spectrometer. In particular, typically, during an LC run, the mass spectrometer may be set to scan a specific mass range. LC/MS data can be represented by adding up the ion current in the individual mass scans and plotting that "totaled" ion current as an intensity point against time. The resulting plot looks like an HPLC UV trace with analyte peaks.

A "fluidic stream" is a fluidic path through which liquids can flow and in particular through which a sample from a sample injection point can be transferred to a detector, e.g., to a mass spectrometer or other detector, and through which the sample may undergo a chromatographic process. The fluidic connection through different parts of the fluidic stream may be discontinuous. This is because the fluidic stream may comprise elements such as switching valves that may establish alternative connections and regulate fluidic flow between different parts of the fluidic stream at different times. The fluidic stream may comprise at least one LC column. The at least one LC column may be exchangeable.

In particular, the LC system may comprise more LC columns than fluidic streams, where a plurality of LC columns may be selectable, e.g., interchangeably coupled to the same fluidic stream. Capillary tubing may be also used to bypass LC columns. A fluidic stream may comprise a plurality of substreams.

In particular, the LC system in accordance with one or more embodiments of this disclosure may comprise a plurality of fluidic streams connected to a downstream valve for directing flow from one fluidic stream at a time to a detector.

An "LC column" may refer to any of a column, a cartridge, a capillary and the like for performing separations of a chromatographic nature. Columns are typically packed or loaded with a stationary phase, through which a mobile phase is pumped in order to trap and/or separate and elute and/or transfer analytes of interest under selected conditions, e.g., according to their polarity or log P value, size or affinity, as generally known. This stationary phase can be particulate or beadlike or a porous monolith. However, the term "column" may also refer to capillaries or channels that are not packed or loaded with a stationary phase, but rely on the surface area of the inner capillary wall or geometrical structures to effect separations. An example is provided by pillar array chromatography, where separation beds are formed by etching away interstitial volumes out of a solid silicon wafer, leaving an array of pillars. The resulting channels can be folded onto a small footprint by concatenating bed segments with optimized flow distributors that limit peak dispersion. This creates a stationary phase support structure that is organized in a reproducible, ordered pattern.

The LC column may be exchangeable and/or operate in parallel or in sequence to one or more other LC columns. An LC column may be for example a rapid trap and elute LC column or "trap-column" for short, a HPLC column or a UHPLC column, and may be of any size, including micro-LC columns and small-bore LC columns, or pillar array LC columns. In the case of trap-columns, a stationary phase can be selected, which retains analytes of interest, whereas any salts, buffer, detergents and other matrix components are unretained and washed away. This process is typically followed by elution of the analytes, e.g., in back flush mode, with a different mobile phase or a solvent gradient. Depending on the analytes, separation of some analytes can be expected in some cases. On the other hand, in case of analytes having identical masses (isobaric) and/or overlapping daughter ion spectra in multiple reaction monitoring (MRM), when it comes to mass spectrometry, a more extensive chromatographic separation could be typical. In that case, separation in a HPLC or UHPLC column may be advantageous.

For the purpose of this disclosure, the at least one fluidic stream comprises at least one HPLC column (where the term "H PLC" encompasses for simplicity also UHPLC or other high-performance column like μ-LC and small-bore columns), distinguished from rapid trap and elute LC columns, and which is typically not subject to backflushing during an analytical run and for which it is typically required to manually intervene by disconnecting the column, reversing the flow direction by reconnecting the column in reversed orientation, and directing the flow to waste and not to the detector in order to backflush it for the only purpose to clean the column.

A "liquid chromatography pump or LC pump" is a high-pressure pump that may vary in pressure capacity but that can yield a consistent and reproducible volumetric flow rate though an LC channel. Pressure in HPLC may typically reach as high as 60 MPa or about 600 atmospheres, whereas UHPLC and µ-LC systems have been developed to work at even higher pressures, e.g., up to 140 MPa or about 1400 atmospheres, and therefore are able to use much smaller particle sizes in the LC columns (<2 µm). LC pumps may be configured as binary pumps or even quaternary pumps, e.g., in case of conditions requiring the use of elution gradients by gradually varying the ratio between up to four elution solvents.

According to one embodiment, the LC pump can yield a pressure of 60 MPa to 140 MPa, typically 75 MPa to 100 MPa, and more typically 80 MPa.

According to one embodiment, the LC pump can be configured to operate with a flow rate between 1 µl/min and 500 µl/min or more, typically up to 1500 µl/min, and more typically operate at flow rates between 100 µl/min to 300 µl/min, and an accuracy of, e.g., about ±5% or less.

The LC pump may comprise more than one pump head. For example, binary pumps comprise two pump heads and each pump head typically comprises a primary pump head and a secondary pump head cooperating with each other for pumping liquid while maintaining the liquid pressure inside the pump head about constant. In particular, each of the primary pump head and of the secondary pump head is typically a syringe-like pump comprising a syringe-like cylinder body having an inner wall surface and a plunger translatable through the cylinder body leaving an interspace between the inner wall surface and the plunger when the plunger is translated through the cylinder body.

The term "liquid" in relation to a fluidic stream refers to liquids commonly used in liquid chromatography, e.g., as solvents or mixtures of solvents used, e.g., as mobile phases or eluents (elution solvents), and as known in the art.

A "downstream pump" is an auxiliary pump distinguished at least in function from the LC pump, possibly a multi-function pump, including at least the function of backflushing the at least one HPLC column in order to clean it. Another possible function is that to facilitate and to speed up liquid exchange within the valve-to-detector conduit. In general, the downstream pump is a lower-pressure and higher-volume (higher-flow-rate) pump compared to the LC pump, and is fluidically connected to the downstream valve. Typically, the downstream pump according to the present disclosure is also a lower-precision pump and hence is also simpler in construction and less expensive in comparison to an LC pump. According to an embodiment of the present disclosure the downstream pump is a positive-pressure pump. Any pump suitable to generate a positive-pressure in order to actively pump a wash liquid or mobile phase from a liquid source through the at least one HPLC column in backflush and/or through the valve-to-detector conduit, via the stream-selection valve, may be used, like for example membrane/diaphragm pumps, single-plunger high-speed pumps, syringe-piston pumps, gear pumps and the like. According to an embodiment, positive pressure and active pumping may be achieved by applying pneumatic pressure, e.g., by pressurized gas, e.g., by a nitrogen supply, into a sealed liquid container connected to the upstream inlet valve.

According to an embodiment, the downstream pump is configured to pump a wash liquid through the HPLC column and/or through the valve-to-detector conduit at a flow rate higher than that of the fluidic streams, e.g., several times higher, for example, 5 times, 10 times, 20 times or higher. For example, in case of µ-LC with typical flow rates around 1 µL/min, a wash pump flow rate of 5 µL/min may be already beneficial. In case of flow rates of the fluidic streams around 100 µL/min, effective flow rates for the downstream pump can be around 500-1000 µL/min or higher. According to some embodiments, flow rates for the downstream pump up to 5000 µL/min are possible. The flow rate may be variable depending on whether the wash liquid is directed to an HPLC column or to the valve-to-detector conduit.

A "wash liquid" can be a liquid suitable to wash out, eventually to dissolve, particulate substances, adsorbed matrix components and the like, build-up on the HPLC column head during multiple sample injections cycles. A wash liquid can be a liquid suitable to wash out, eventually to dissolve, eventual traces of samples from the valve-to-detector conduit while still being compatible with the detector used, e.g., with a mass spectrometer. A wash liquid may be the same as or similar to an elution solvent used for chromatography, which depending on the type of column, or type of samples and analytes passed through the column may be different. For example, for analytes for which typically reversed-phase chromatography is used, suitable solvents may be organic solvents like methanol, acetonitrile, tetrahydrofuran, and/or isopropylic alcohol. These solvents may be also mixed with each other and/or with water. Acidic or basic additives may be added to adjust the pH. Typical additives can include formic acid, ammonium formate, ammonium acetate, etc. For example, for analytes for which typically normal-phase chromatography is used, suitable solvents may include solvents like hexane, heptane mixed with polar organic solvents such as ethyl acetate, chloroform or 2-propanol. The wash liquid may be the same or different for backflushing an HPLC column and for washing the valve-to-detector conduit respectively, depending on the HPLC column.

The term "valve" refers to a flow-regulating device to control, redirect, restrict or stop flow and, in particular, to an LC switching valve, that is a multi-port valve that controls flow between elements connected to the ports. This is typically achieved by moving one or more valve conduits to switch communication between different elements. Elements may be fluidically connected to the ports via further conduits, like pipes, tubes, capillaries, microfluidic channels and the like, and by fittings like screws/nuts and ferrules, or alternative liquid-tight seals, e.g., maintained in place by a clamp mechanism. An LC switching valve is normally capable of allowing liquid pressures in the order of magnitude used for HPLC or higher.

In particular, the "downstream valve" is an LC switching valve located downstream with respect to the at least one HPLC column in the normal direction of flow from the HPLC column to the detector. The downstream valve may comprise a port for each fluidic stream, a port for the valve-to-detector conduit, one or more downstream-pump ports and one or more waste ports.

According to an embodiment, the downstream valve has an inner valve conduit(s) with an inner diameter of less than 0.6 mm, typically between about 0.5 mm and 0.2 mm, more typically about 0.4 mm, and even more typically about 0.25 mm. The inner valve conduit can have however any other diameter in typically used ranges.

According to an embodiment, the downstream valve has a typical switching time of about 500 ms or less. The switching time can be however also longer than 500 ms.

According to an embodiment, the LC system comprises a plurality of fluidic streams alternately connectable to the valve-to-detector conduit via the downstream valve.

According to an embodiment, the downstream pump is also connectable to the valve-to-detector conduit via the downstream valve in order to wash the valve-to-detector conduit.

According to an embodiment, the downstream pump is configured to connect to the valve-to-detector conduit between two consecutive fluidic streams in order to wash liquid from a previous fluidic stream out of the valve-to-detector conduit before liquid from a subsequent fluidic stream enters the valve-to-detector conduit.

According to an embodiment, the downstream pump is connected to the downstream valve via a wash selection valve, where the wash selection valve is configured to alternately connect to any one of the at least one fluidic stream and to the valve-to-detector conduit via the downstream valve.

A "wash selection valve" is an LC switching valve located between the downstream pump and the downstream valve, and comprising a downstream-pump inlet port, one wash outlet port for each fluidic stream to be backflushed, where the fluidic connection between the outlet port and the respective fluidic stream is via the downstream valve, and eventually one wash outlet port connectable to the valve-to-detector conduit via the downstream valve.

According to an embodiment, the wash selection valve is connectable to the at least one fluidic stream via a respective three-way valve fluidically connected to the downstream valve, the three-way valve comprising a wash-selection-valve inlet port, a downstream-valve outlet port and a waste outlet port.

The LC system may comprise a controller configured to automatically backflush the at least one HPLC column at regular intervals and/or upon detection of a pressure rise above a predetermined threshold in the at least one fluidic stream and/or upon detection of performance reduction below a predetermined threshold, by e.g., monitoring data like increase of signal background, shifts in analyte retention times, peak shape alteration and the like during use of the at least one HPLC column.

According to an embodiment, the controller is further configured to manage a fluidic-stream-to-detector connection time, that is the connection time between the at least one fluidic stream and the valve-to-detector conduit, a downstream-pump-to-detector connection time, that is the connection time between the downstream pump and the valve-to-detector conduit, and a downstream-pump-to-fluidic-stream connection time, that is the connection time between the at least one fluidic stream and the downstream pump, by controlling switching of any one or more of the downstream valve, the wash selection valve, the three-way valve(s).

According to an embodiment, the fluidic-stream-to-detector connection time is fixed and is the same for each fluidic stream. In addition, the downstream-pump-to-detector connection time is fixed and is a fraction of the fluidic-stream-to-detector connection time, thereby resulting at least temporarily in a continuous switching at a regular pace. It may in particular be beneficial if the downstream-pump-to-detector connection time is 20% or less, typically 10% or less, or more typically 5% or less of the fluidic-stream-to-detector connection time and that the conditions of the downstream pump in terms of, e.g., flow rate and/or washing liquid, are so adapted that the downstream-pump-to-detector connection time is minimized. In absolute terms the downstream-pump-to-detector connection time may be as short as a few seconds, typically 5 s or less, more typically 3 s or less.

As used herein, the term "controller" can mean a processing unit, such as a microprocessor, a microcontroller, a reduced instruction circuit (RISC), an application specific integrated circuit (ASIC), a logic circuit, and any other circuit or processor capable of executing the functions/methods described herein.

The controller may be integrated into the analytical system or be a separate logic entity in communication with the analytical system via a direct connection, wired or wirelessly, or indirectly over a communications network, wired or wirelessly, such as a wide area network, e.g., the Internet or a Health Care Provider's local area network or intranet, via a network interface device. In some embodiments, the processor might be integral with a data management unit, e.g., implemented on a computing device such as a desktop computer, a laptop, a smartphone, a tablet, PDA, etc. It may include a server computer and/or be distributed/shared across/between a plurality of analytical systems. Moreover, the analytical system can include remote devices, servers and cloud-based elements that communicate via wires or wirelessly (e.g., infrared, cellular, Bluetooth®) with the controller, or a remote PC/server or a cloud-based system. The controller may be also configurable to control the analytical system in a way that workflow(s) and workflow step(s) are conducted by the analytical system. In particular, the processor may communicate and/or cooperate with a scheduler and/or a data manager in order to take into account incoming test orders and/or received test orders, and a number of scheduled process operations associated with the execution of the test orders, in combination with managing the various connection times and valves switching.

In accordance with another embodiment of the instant disclosure, an automated LC method is herein also disclosed, the method comprising fluidically connecting at least one fluidic stream comprising at least one HPLC column to a downstream valve in order to connect the at least one fluidic stream to a detector via a valve-to-detector conduit, the method further comprising fluidically connecting a downstream pump to the at least one fluidic stream (via the downstream valve in order to backflush and thereby clean the at least one HPLC column.

According to an embodiment, the LC method comprises alternately connecting a plurality of fluidic streams to the valve-to-detector conduit via the downstream valve.

According to an embodiment, the LC method comprises connecting the downstream pump to the valve-to-detector conduit via the downstream valve in order to wash the valve-to-detector conduit.

According to an embodiment, the LC method comprises connecting the downstream pump to the valve-to-detector conduit between two consecutive fluidic streams in order to wash liquid from a previous fluidic stream out of the valve-to-detector conduit before liquid from a subsequent fluidic stream enters the valve-to-detector conduit.

According to an embodiment, the LC method comprises connecting the downstream pump to the downstream valve via a wash selection valve, and alternately connecting the wash selection valve to any one of the at least one fluidic stream and to the valve-to-detector conduit via the downstream valve.

According to an embodiment, the LC method comprises connecting the wash selection valve to the at least one fluidic stream via a respective three-way valve fluidically connected to the downstream valve, the three-way valve comprising a wash-selection-valve inlet port, a downstream-valve outlet port and a waste outlet port.

According to an embodiment, the LC method comprises automatically backflushing the at least one HPLC column at regular intervals and/or upon detection of a pressure rise above a predetermined threshold in the at least one fluidic stream and/or upon detection of performance reduction below a predetermined threshold, by e.g., monitoring data like increase of signal background, shifts in analyte retention times, peak shape alteration and the like during use of the at least one HPLC column.

According to an embodiment, the LC method comprises automatically managing by a controller a fluidic-stream-to-detector connection time, that is the connection time between the at least one fluidic stream and the valve-to-detector conduit, a downstream-pump-to-detector connection time, that is the connection time between the downstream pump and the valve-to-detector conduit, and a downstream-pump-to-fluidic-stream connection time, that is the connection time between the at least one fluidic stream and the downstream pump, by controlling switching of any one or more of the downstream valve, wash selection valve, three-way valve(s).

According to an embodiment, the method can further comprise automatically managing a fluidic-stream connection time, that is the connection time between each fluidic stream and the valve-to-detector conduit, and a wash-pump connection time, that is the connection time between the wash pump and the valve-to-detector conduit, by controlling switching of the stream-selection valve.

According to another embodiment, the fluidic-stream connection time can be fixed and is the same for each fluidic stream, and wherein the wash-pump connection time is fixed and is a fraction of the fluidic-stream connection time, thereby resulting at least temporarily in a continuous switching at a regular pace.

In order that the embodiments of the present disclosure may be more readily understood, reference is made to the following examples, which are intended to illustrate the disclosure, but not limit the scope thereof.

FIGS. 1A-1F and FIGS. 2A-2C taken together show a schematic example of liquid chromatographic (LC) system 100 comprising a plurality of fluidic streams 11, 12, 13 alternately connectable to a common detector 60 via a downstream valve 20 connected to the detector 60 via a valve-to-detector conduit 30, each of the fluidic streams 11, 12, 13 comprising at least one HPLC column. The LC system 100 further comprises a downstream pump 40 fluidically connected to the downstream valve 20 and configured to connect to the valve-to-detector conduit 30 between two consecutive fluidic streams 11,12; 12,13; 13,11 in order to wash liquid from a previous fluidic stream out of the valve-to-detector conduit 30 before liquid from a subsequent fluidic stream enters the valve-to-detector conduit 30.

In particular, the downstream valve 20 comprises in this case a fluidic-stream port 21, 22, 23 for each fluidic stream 11, 12, 13, respectively, a waste port 21', 22', 23' for each fluidic stream 11, 12, 13, respectively, leading to a waste 50, where the waste ports 21', 22', 23' can function also as downstream-pump-inlet ports 21', 22', 23' connectable to the fluidic streams 11, 12, 13, via the fluidic-stream port 21, 22, 23 respectively, in order to backflush and thereby clean the fluidic streams 11, 12, 13. The downstream valve 20 comprises in addition a valve-to-detector conduit port 25, connected to the valve-to-detector conduit 30 and alternately connectable to each of the fluidic stream 11, 12, 13 via the fluidic-stream ports 21, 22, 23 respectively. The downstream valve 20 further comprises an additional downstream-pump-inlet port 24 also connectable to the valve-to-detector conduit 30 via the valve-to-detector conduit port 25 and a downstream-pump-waste port 24' leading to the waste 50 when connected to the downstream-pump-inlet port 24. It is clear that this is only an example and the number of ports and connections, as well as the sequence of switching between fluidic streams, may be adapted according to the need and according to the number of fluidic streams.

The downstream pump 40 is connected in this example to four wash liquid containers containing respective wash liquid 41, 42, 43, 44 such as, for example, water, acetonitrile, methanol, tetrahydrofuran or isopropylic alcohol, which may be pumped individually or mixed with each other in any combination and ratio, depending, e.g., on the LC conditions, on the type of HPLC column, on the type of samples and/or analytes flowing in between and on the desired washing effect. In particular, the washing pump 40 may be configured to pump a wash liquid through the valve-to-detector conduit 30 and/or through the fluidic stream 11, 12, 13 in backflush mode at a flow rate 45 higher than a flow rate 15 of the fluidic streams 11, 12, 13 by respective upstream LC pumps (not shown in FIGS. 1A-1F, FIGS. 2A-2C).

The downstream pump 40 is connected to the downstream valve 20 via a wash selection valve 70. The wash selection valve 70 is configured to alternately connect the downstream pump 40 to any one of the fluidic streams 11, 12, 13 and to the valve-to-detector conduit 30 via the downstream valve 20. In particular, the wash selection valve 70 is connectable to the fluidic streams 11, 12, 13 via respective fluidic stream wash ports 71, 72, 73 leading to respective three-way valves 16, 17, 18 fluidically connected to the downstream valve 20 via the downstream-pump-inlet ports 21', 22', 23' respectively, the three-way valves 16, 17, 18 each comprising a wash-selection-valve inlet port, a downstream-valve outlet port and a waste outlet port leading to the waste 50. The wash selection valve 70 further comprises a valve-to-detector-conduit wash port 74 connected to the downstream valve 20 via the downstream-pump-inlet port 24.

The LC system 100 further comprises a controller 90 configured to automatically backflush the HPLC columns of the respective fluidic streams 11, 12, 13 at regular intervals and/or upon detection of a pressure rise above a predetermined threshold in the at least one fluidic stream and/or upon detection of performance reduction of the HPLC columns below a predetermined threshold.

The controller 90 is further configured to manage a fluidic-stream-to-detector connection time, that is the connection time between the a fluidic stream 11, 12, 13 and the valve-to-detector conduit 30, a downstream-pump-to-detector connection time, that is the connection time between the downstream pump 40 and the valve-to-detector conduit 30, and a downstream-pump-to-fluidic-stream connection time, that is the connection time between a fluidic stream 11, 12, 13 and the downstream pump 40, by controlling switching of the downstream valve 20, the wash selection valve 70 and the three-way valves 16, 17, 18.

With continued reference to FIGS. 1A-1F, FIGS. 2A-2C taken together, an LC method is also schematically shown, the method comprising fluidically connecting at least one fluidic stream 11, 12, 13 comprising at least one HPLC column to a downstream valve 20 in order to connect the at least one fluidic stream 11, 12, 13 to a detector 60 via a valve-to-detector conduit 30, the method further comprising fluidically connecting a downstream pump 40 to the at least one fluidic stream 11, 12, 13 via the downstream valve 20 in order to backflush and thereby clean the at least one HPLC column.

The LC method further comprises alternately connecting a plurality of fluidic streams 11, 12, 13 to the valve-to-detector conduit 30 via the downstream valve 20.

The LC method further comprises connecting the downstream pump 40 to the valve-to-detector conduit 30 via the downstream valve 20 in order to wash the valve-to-detector conduit 30.

The LC method further comprises connecting the downstream pump 40 to the valve-to-detector conduit 30 between two consecutive fluidic streams 11,12; 12,13; 13,11 in order to wash liquid from a previous fluidic stream out of the valve-to-detector conduit 30 before liquid from a subsequent fluidic stream enters the valve-to-detector conduit 30.

The LC method further comprises connecting the downstream pump 40 to the downstream valve 20 via the wash selection valve 70 and alternately connecting the wash selection valve 70 to any one of the at least one fluidic stream 11, 12, 13 and valve-to-detector conduit 30 via the downstream valve 20.

Particularly, the LC method comprises connecting the wash selection valve 70 to the at least one fluidic stream 11, 12, 13 via a respective three-way valve 16, 17, 18 fluidically connected to the downstream valve 20, the three-way valve 16, 17, 18 comprising a wash-selection-valve inlet port, a downstream-valve outlet port and a waste outlet port.

According to an embodiment, the LC method further comprises automatically backflushing the at least one HPLC column at regular intervals and/or upon detection of a pressure rise above a predetermined threshold in the at least one fluidic stream and/or upon detection of performance reduction of the at least one HPLC column below a predetermined threshold.

The LC method may further comprise automatically managing by the controller 90 a fluidic-stream-to-detector connection time, that is the connection time between the at least one fluidic stream 11, 12, 13 and the valve-to-detector conduit 30, a downstream-pump-to-detector connection time, that is the connection time between the downstream pump 40 and the valve-to-detector conduit 30, and a downstream-pump-to-fluidic-stream connection time, that is the connection time between the at least one fluidic stream 11, 12, 13 and the downstream pump 40, by controlling switching of any one or more of the downstream valve 20, the wash selection valve 70, the three-way valve(s) 16, 17, 18.

In particular, FIG. 1A shows a first step of the method in which the downstream-valve 20 is switched such as the fluidic stream 11 is connected and directed to the valve-to-detector conduit 30, whereas the other fluidic streams 12, 13 are directed to waste 50 via waste ports 22', 23', and three-way valves 17, 18 respectively. Wash liquid from the downstream pump 40 is also directed to waste 50 via the downstream valve 20, the wash selection valve 70 being connected to the downstream-pump-inlet port 24 via the valve-to-detector-conduit wash port 74 and the downstream-pump-inlet port 24 being connected to the downstream-pump-waste port 24'.

Figure 1B:
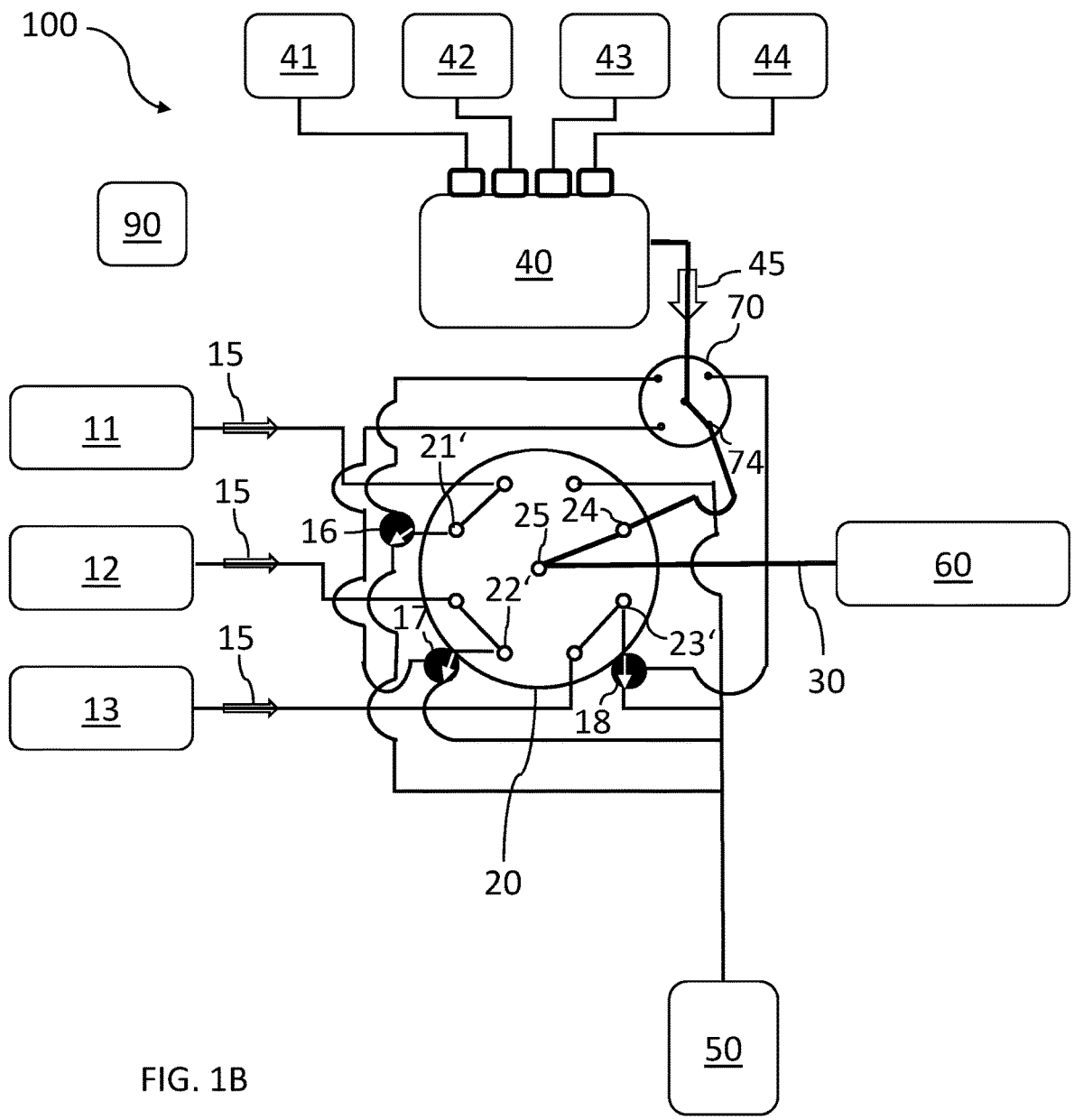
FIG. 1B shows schematically the same LC system of FIG. 1A and a second step of the same method.
Figure 1C:
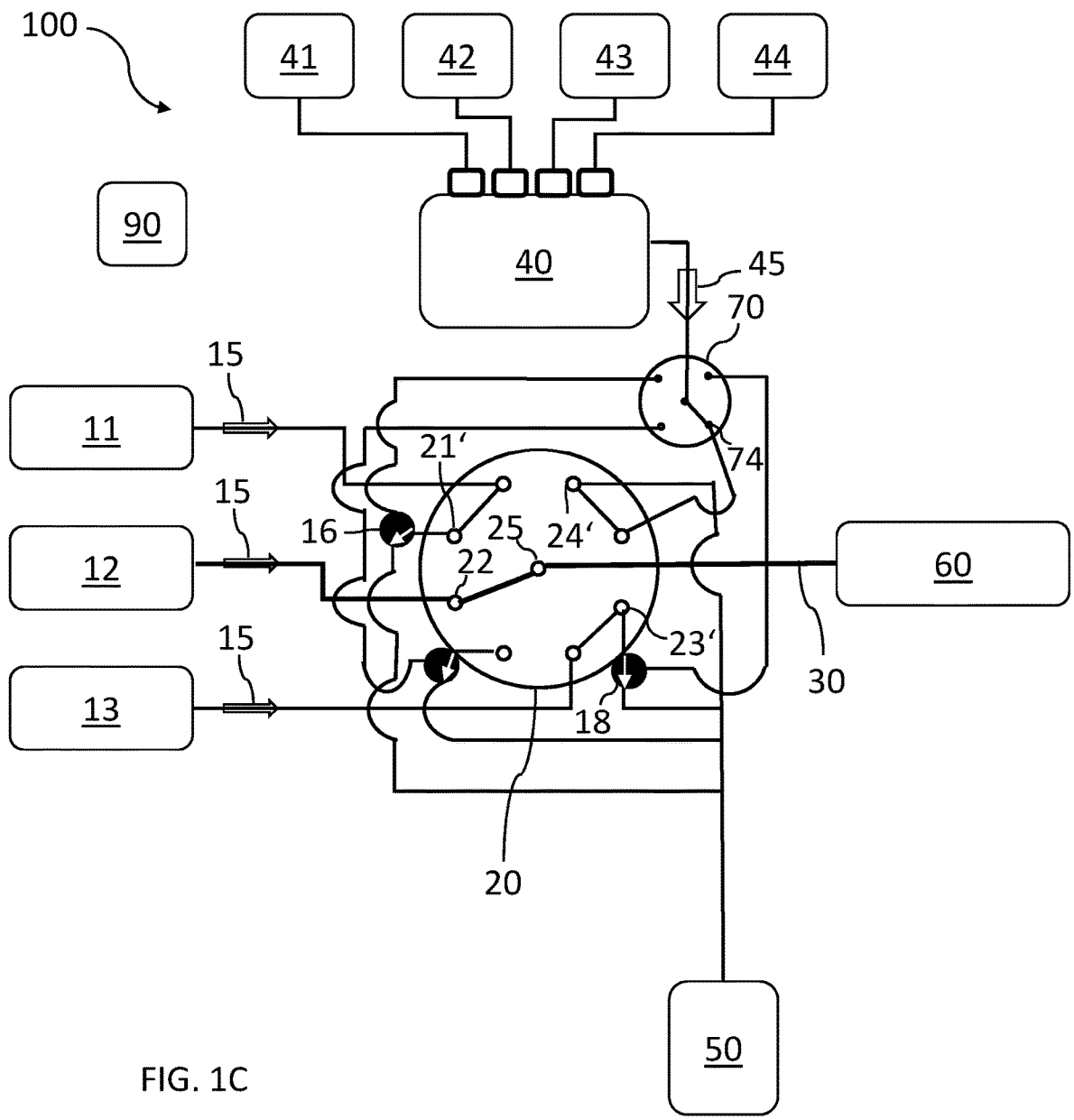
FIG. 1C shows schematically the same LC system of FIG. 1A and a third step of the same method.

FIG. 1B shows a second step of the method in which the downstream valve 20 is switched such as the downstream pump 40 is connected to the valve-to-detector conduit 30, by having the downstream-pump-inlet port 24 directly connected to the valve-to-detector conduit port 25 whereas all fluidic streams 11, 12, 13 are directed to waste 50 via waste ports 21', 22', 23' and three-way valves 16, 17, 18 respectively.

FIG. 10 shows a third step of the method in which the downstream valve 20 is switched such as the fluidic stream 12 is connected to the valve-to-detector conduit 30, whereas the other fluidic streams 11, 13 are directed to waste 50 via waste ports 21', 23' and three-way valves 16, 18 respectively. Wash liquid from the downstream pump 40 is also directed to waste 50 via the downstream-pump-waste port 24' of the downstream valve 20 as in FIG. 1A.

Figure 1D:
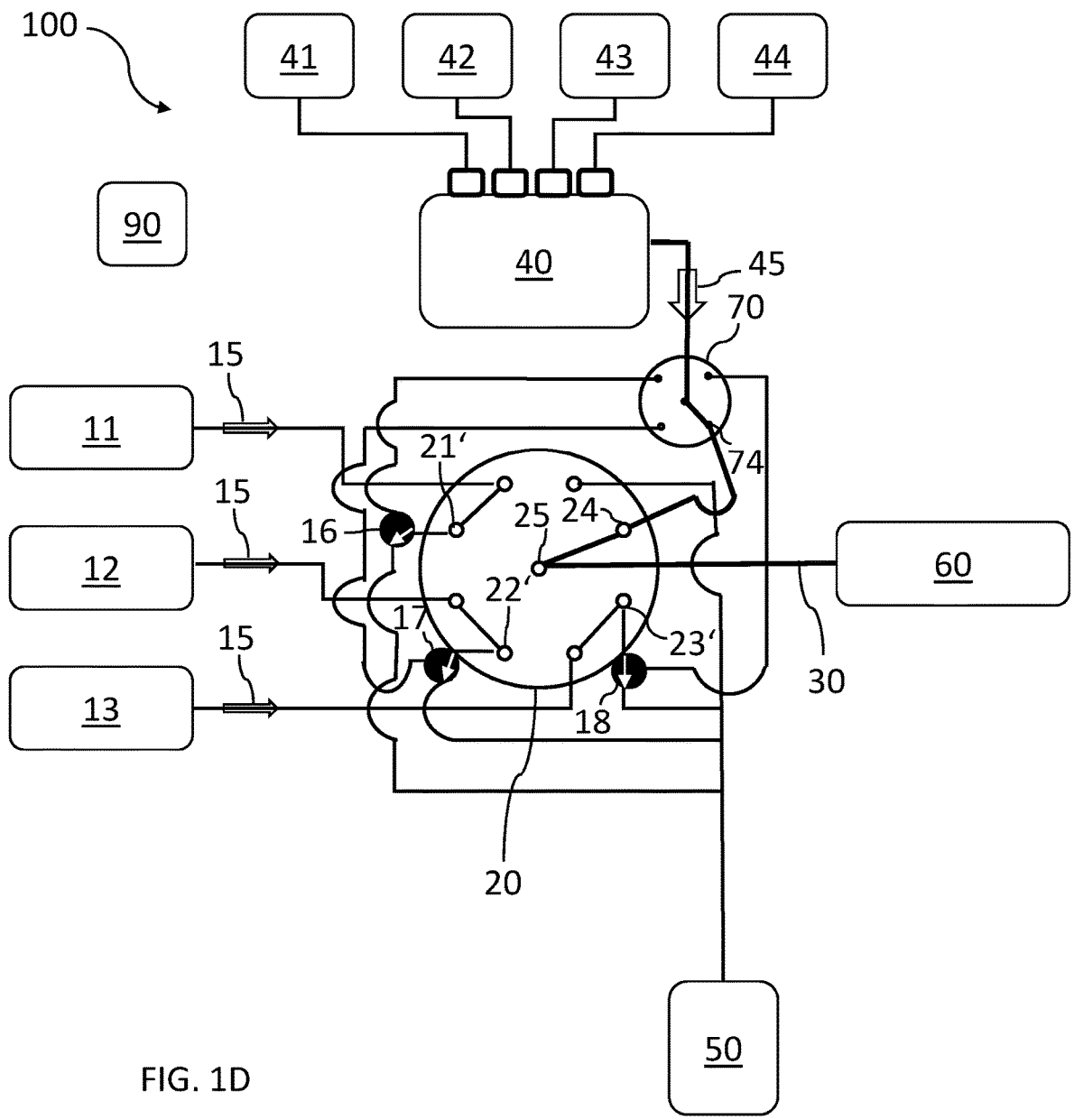
FIG. 1D shows schematically the same LC system of FIG. 1A and a fourth step of the same method, which is identical to that of FIG. 1B.

The fourth step of the method as shown in FIG. 1D is identical to the second step of FIG. 1B.

Figure 1E:
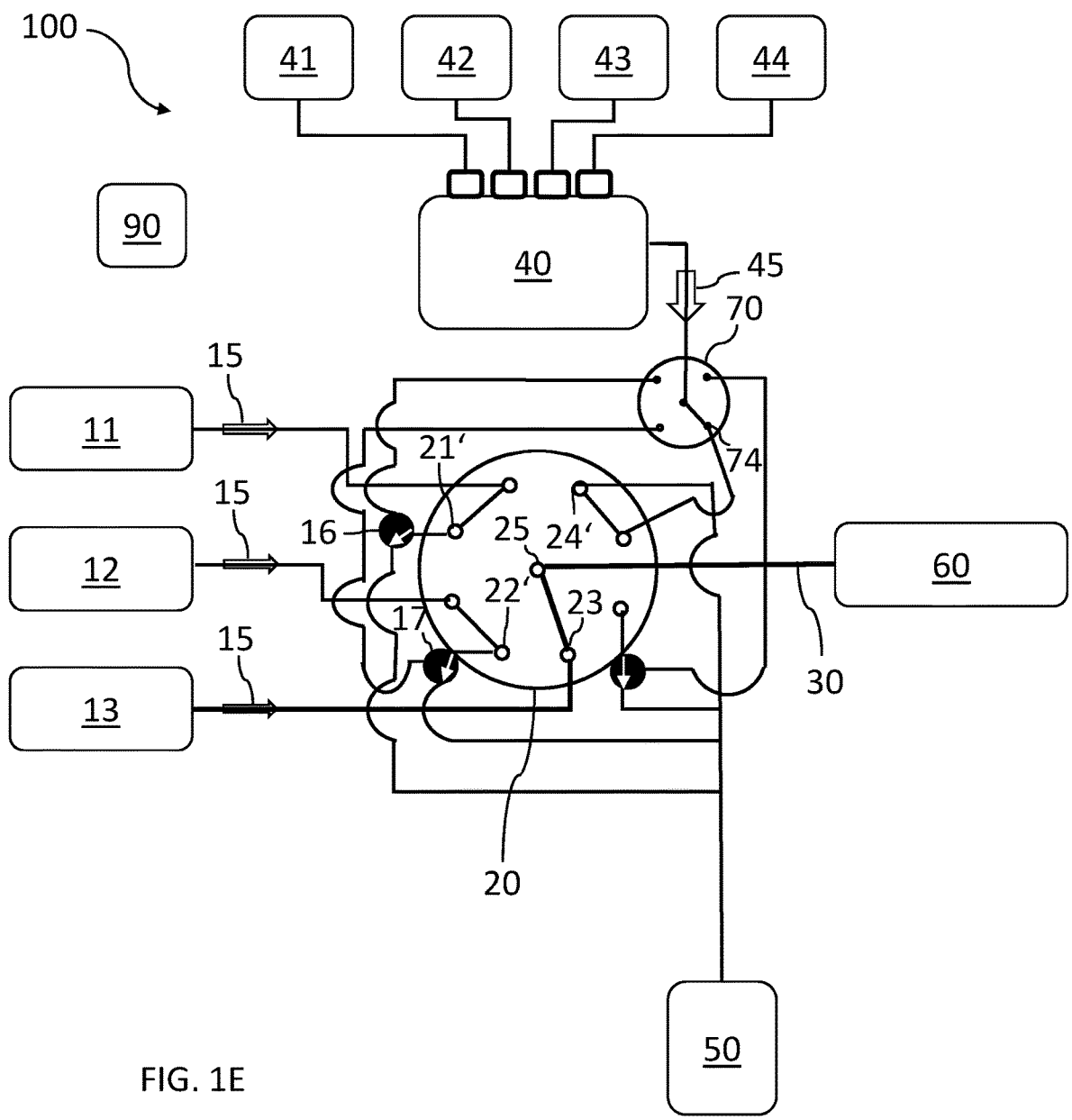
FIG. 1E shows schematically the same LC system of FIG. 1A and a fifth step of the same method.

FIG. 1E shows a fifth step of the method in which the downstream valve 20 is switched such as the fluidic stream 13 is connected to the valve-to-detector conduit 30, whereas the other fluidic streams 11, 12 are directed to waste 50 via waste ports 21', 22' and three-way valves 16, 17 respectively. Wash liquid from the downstream pump 40 is also directed to waste 50 via the downstream-pump-waste port 24' of the downstream valve 20 as in FIG. 1A and FIG. 10.

Figure 1F:
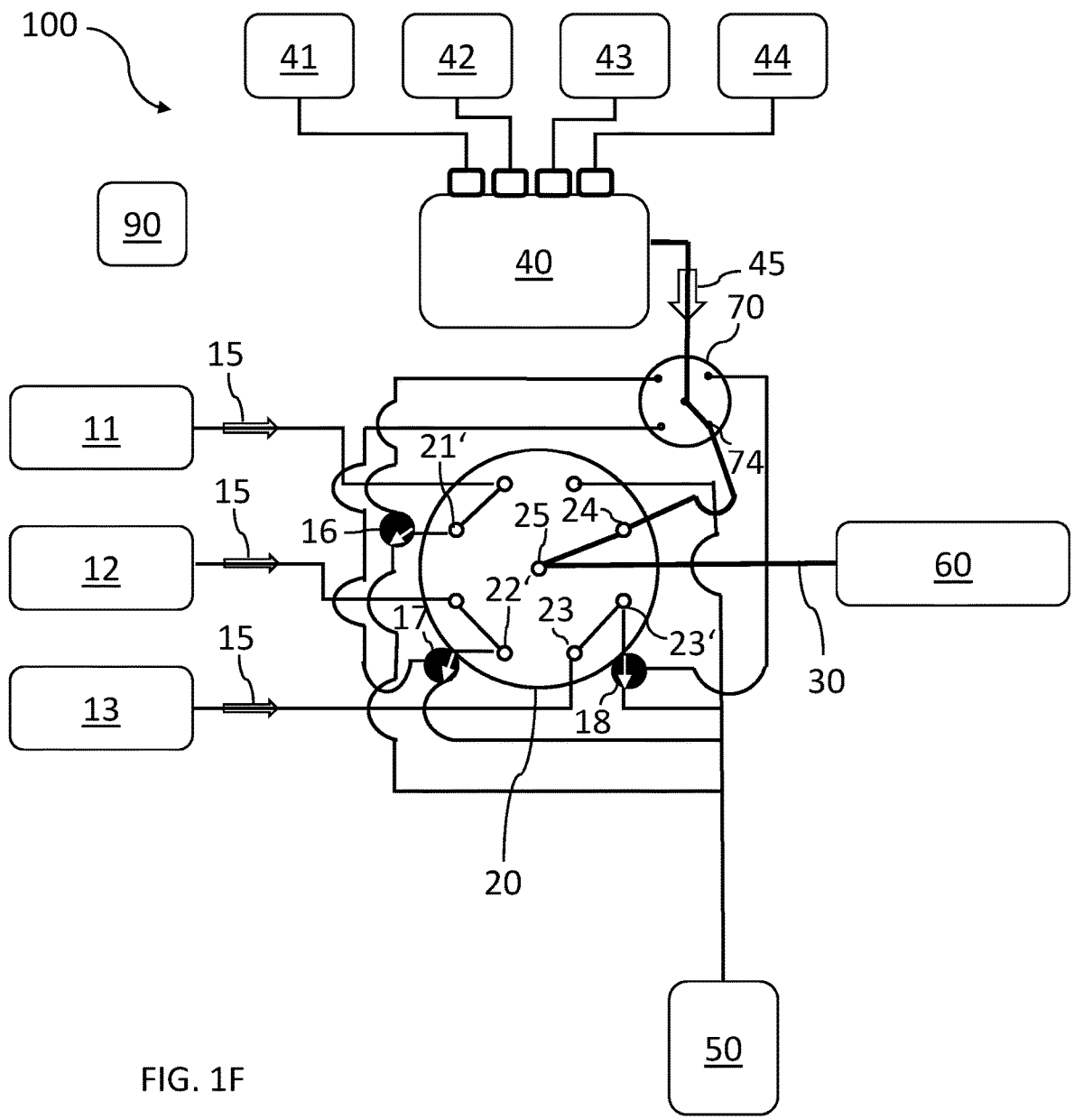
FIG. 1F shows schematically the same LC system of FIG. 1A and a sixth step of the same method, which is identical to that of FIG. 1B and FIG. 1D.

The sixth step of the method shown in FIG. 1F is identical to the second step of FIG. 1B and fourth step of FIG. 1B, before starting over again with the first step of FIG. 1A.

Figure 2A:
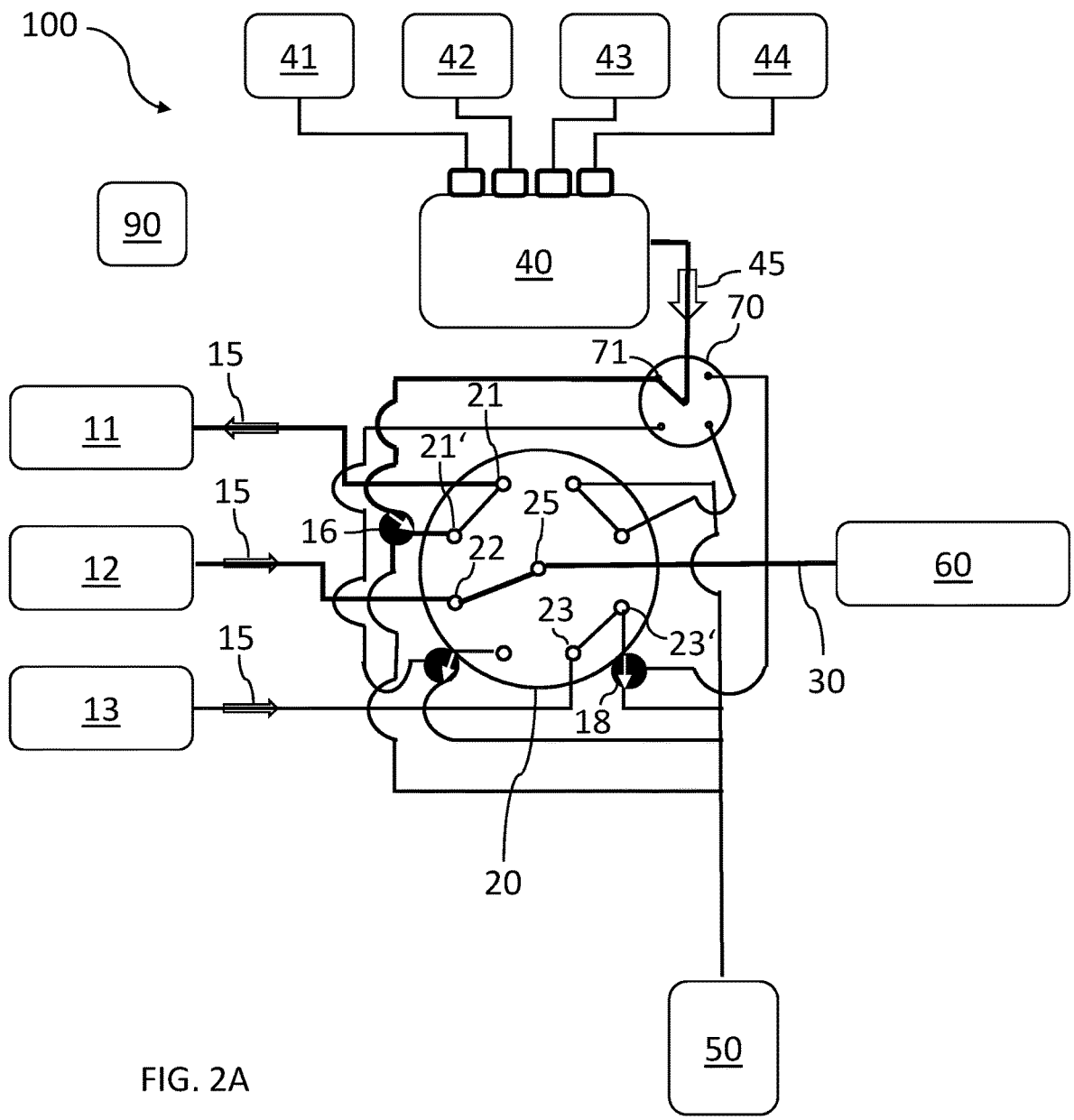
FIG. 2A shows schematically the same LC system of FIGS. 1A-1F and a first step of a method of using the downstream pump for backflushing the fluidic streams.

FIG. 2A shows schematically a further step of the method, where the downstream pump 40 is used for backflushing the fluidic stream 11. In particular, the wash selection valve 70, the downstream valve 20 and the three-way valve 16 are switched such that the downstream pump 40 is connected via the fluidic stream wash port 71, the three-way valve 16, the downstream-pump-inlet port 21' and the fluidic-stream port 21 to the fluidic stream 11. At the same time, the fluidic stream 12 is connected to the valve-to-detector conduit 30 via fluidic-stream port 22 and valve-to-detector conduit port 25, whereas the fluidic stream 13 is directed to waste 50 via fluidic-stream port 23, waste port 23' and three-way valve 18 respectively. It is to be noticed that the direction of flow 15 for the fluidic stream 11 is inverted in FIG. 2A.

Figure 2B:
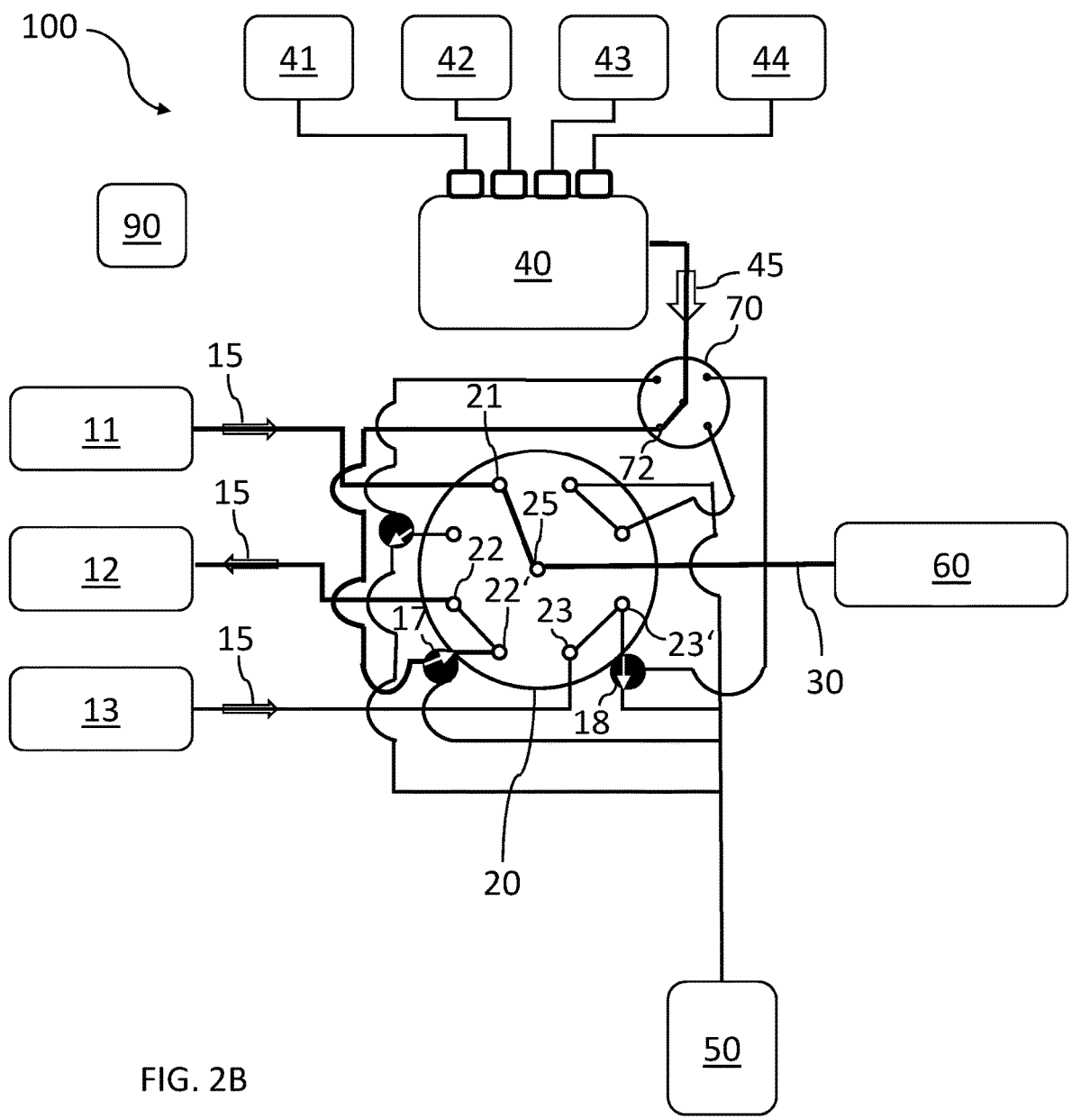
FIG. 2B shows schematically the same LC system of FIG. 2A and a second step of the same method.

FIG. 2B shows schematically a further step of the method, where the downstream pump 40 is used for backflushing the fluidic stream 12. In particular, the wash selection valve 70, the downstream valve 20 and the three-way valve 17 are switched such that the downstream pump 40 is connected via the fluidic stream wash port 72, the three-way valve 17, the downstream-pump-inlet port 22' and the fluidic-stream port 22 to the fluidic stream 12. At the same time, the fluidic stream 11 is connected to the valve-to-detector conduit 30 via fluidic-stream port 21 and valve-to-detector conduit port 25, whereas the fluidic stream 13 is directed to waste 50 via fluidic-stream port 23, waste port 23' and three-way valve 18 respectively. It is to be noticed that the direction of flow 15 for the fluidic stream 12 is inverted in FIG. 2B.

Figure 2C:
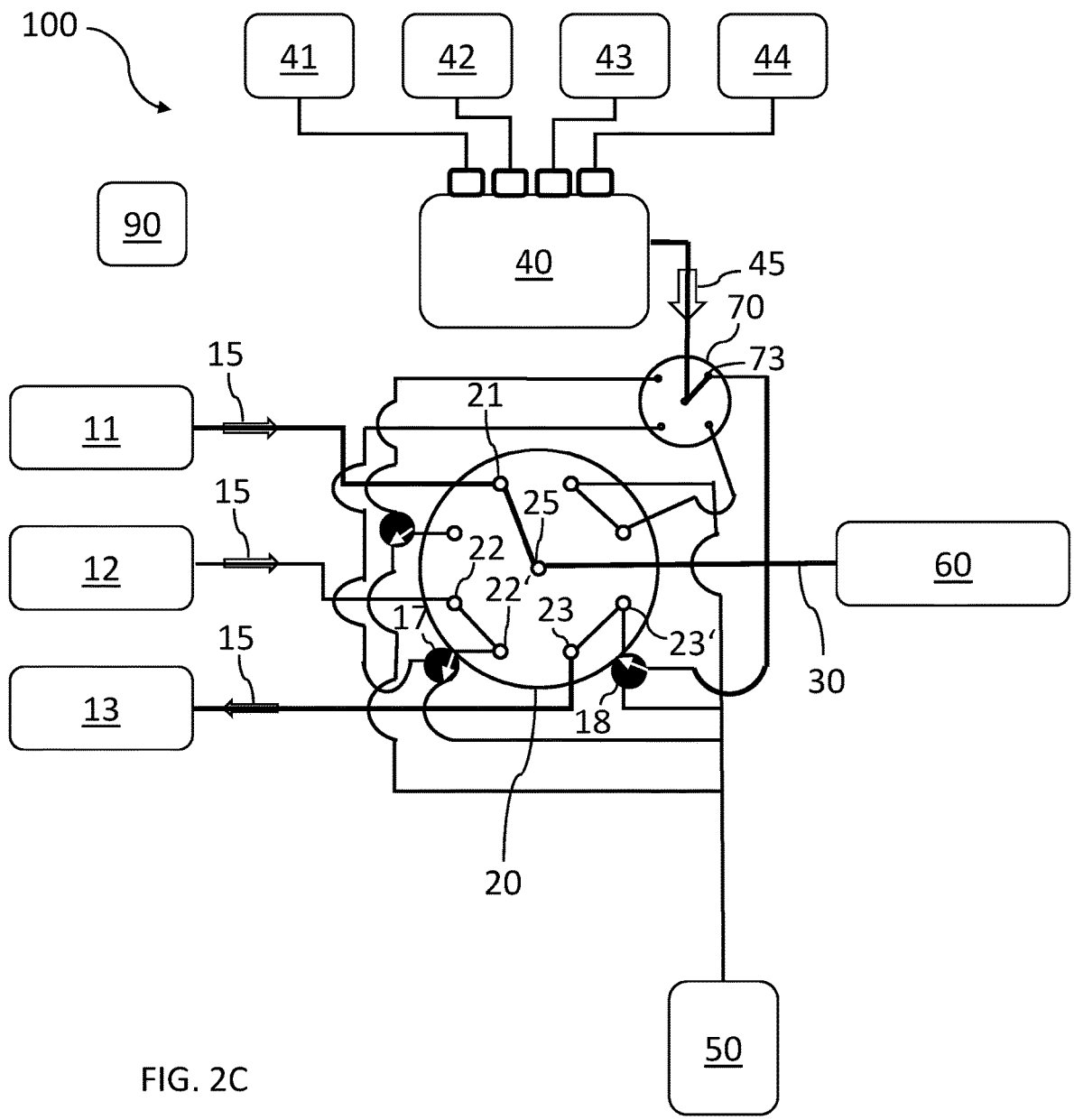
FIG. 2C shows schematically the same LC system of FIG. 2A and a third step of the same method.

FIG. 2C shows schematically a further step of the method, where the downstream pump 40 is used for backflushing the fluidic stream 13. In particular, the wash selection valve 70, the downstream valve 20 and the three-way valve 18 are switched such that the downstream pump 40 is connected via the fluidic stream wash port 73, the three-way valve 18, the downstream-pump-inlet port 23' and the fluidic-stream port 23 to the fluidic stream 13. At the same time, the fluidic stream 11 is connected to the valve-to-detector conduit 30 via fluidic-stream port 21 and valve-to-detector conduit port 25, whereas the fluidic stream 12 is directed to waste 50 via fluidic-stream port 22, waste port 22' and three-way valve 17 respectively. It is to be noticed that the direction of flow 15 for the fluidic stream 13 is inverted in FIG. 2C.

Figure 3A:
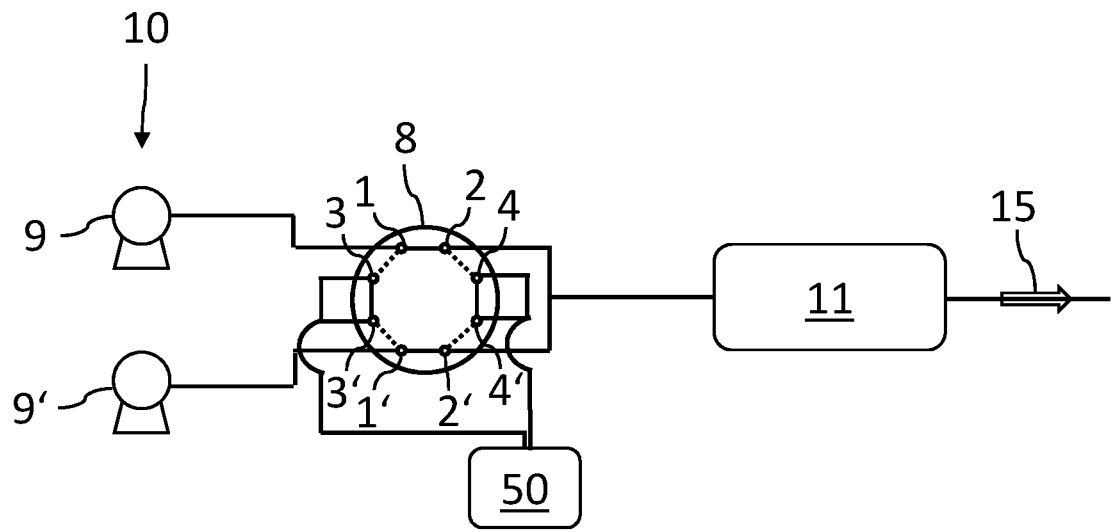
FIG. 3A shows schematically further aspects of the LC system and method of FIGS. 1A-1E.

FIG. 3A shows schematically further aspects of the LC system 100 and method of FIGS. 1A-1E. In particular, the LC system 100 further comprises an upstream LC pump 10 for each fluidic stream 11 (only one fluidic stream shown in FIG. 3A for simplicity) and in particular a binary LC pump comprising two pump heads 9, 9' merging into the fluidic stream 11 via an upstream valve 8. The upstream valve 8 is embodied in this example as an 8-port/two-way valve comprising two upstream pump inlet ports 1, 1' fluidically connected to the pump heads 9, 9' respectively, two upstream pump outlet ports 2, 2' leading to the fluidic stream 11, two upstream pump waste ports 3, 3' leading liquid pumped by the pump heads 9, 9' respectively to waste 50, and two backflush waste ports 4, 4'. The method of FIG. 3A comprises switching the upstream valve 8 such that the upstream pump inlet ports 1, 1' are connected to the upstream pump outlet ports 2, 2' respectively in order to direct liquid flow from the upstream LC pump 10 into the fluidic stream 1, via the upstream valve 8, in normal flow direction 15.

Figure 3B:
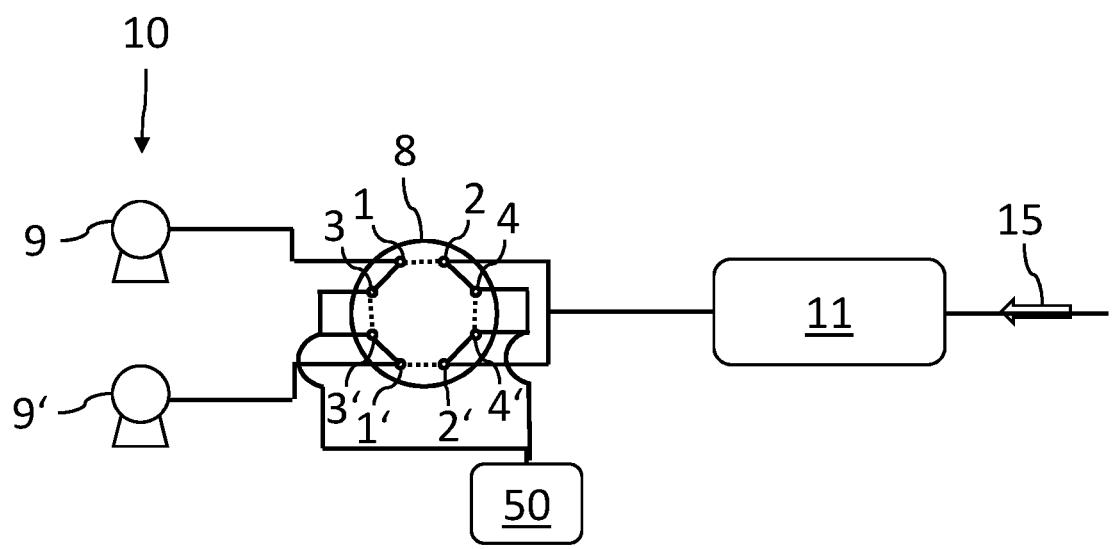
FIG. 3B shows schematically the same LC system of FIG. 3A and further aspects of the method of FIGS. 2A-2C.

FIG. 3B shows schematically the same LC system 100 of FIG. 3A and further aspects of the method of FIGS. 2A-2C. In particular the method comprises switching the upstream valve 8 such that the upstream pump inlet ports 1, 1' are connected to the upstream pump waste ports 3, 3' respectively, thus leading liquid pumped by the pump heads 9, 9' to waste. Also, the upstream pump outlet ports 2, 2' are connected to the backflush waste ports 4, 4' respectively in order to direct liquid flow from the downstream pump via the fluidic stream 11 in reversed flow direction 15 to waste 50.

In the preceding specification, numerous specific details are set forth in order to provide a thorough understanding of the present disclosure. It will be apparent, however, to one having ordinary skill in the art, that the specific details need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the disclosure may be practiced otherwise than as specifically devised in the above examples.

Reference throughout the preceding specification to "one embodiment", "an embodiment", "one example" or "an example", "one aspect" or "an aspect" means that a particular feature, structure or characteristic described in connection with the embodiment or example or aspect is included in at least one embodiment. Thus, appearances of the phrases "in one embodiment", "in an embodiment", "one example" or "an example", "one aspect" or "an aspect" in various places throughout this specification are not necessarily all referring to the same embodiment or example or aspect.

Furthermore, the particular features, structures, or characteristics may be combined in any suitable combinations and/or sub-combinations in one or more embodiments or examples or aspects.

What is claimed is:

1. A liquid chromatographic (LC) system comprising
at least one HPLC column,
a downstream valve fluidically connected to the at least one HPLC column and fluidically connectable to a detector via a valve-to-detector conduit, wherein the at least one HPLC column is fluidically connectable to the valve-to-detector conduit via the downstream valve,
characterized in that
the LC system further comprises a pump fluidically connected to the downstream valve and fluidically connectable to the at least one HPLC column via the downstream valve in order to backflush and thereby clean the at least one HPLC column,
wherein the at least one HPLC column comprises at least two HPLC columns, and
wherein the at least two HPLC columns are alternately fluidically connectable to the valve-to-detector conduit via the downstream valve.

2. The LC system according to claim 1 wherein the pump is also fluidically connectable to the valve-to-detector conduit via the downstream valve in order to wash the valve-to-detector conduit.

3. The LC system according to claim 2 wherein the pump is configured to fluidically connect to the valve-to-detector conduit between two consecutive HPLC columns of the at least two HPLC columns in order to wash liquid from a previous HPLC column out of the valve-to-detector conduit before liquid from a subsequent HPLC column enters the valve-to-detector conduit.

4. The LC system according to claim 1 wherein the pump is fluidically connected to the downstream valve via a wash selection valve, and wherein the wash selection valve is configured to alternately fluidically connect to any one of the at least two HPLC columns and to the valve-to-detector conduit via the downstream valve.

5. The LC system according to claim 4 wherein the wash selection valve is fluidically connectable to any of the at least two HPLC columns via a respective three-way valve fluidically connected to the downstream valve, the three-way valve comprising a wash-selection-valve inlet port, a downstream-valve outlet port, and a waste outlet port.

6. The LC system according to claim 1 comprising a controller configured to automatically backflush the at least two HPLC columns at regular intervals and/or upon detection of a pressure rise above a predetermined threshold in the at least two HPLC columns and/or upon detection of performance reduction of each of the at least two HPLC columns below a predetermined threshold.

7. The LC system according to claim 6 wherein the controller is further configured to manage a fluidic-stream-to-detector connection time, that is the connection time between the at least two HPLC columns and the valve-to-detector conduit, a pump-to-detector connection time, that is the connection time between the pump and the valve-to-detector conduit, and a pump-to-fluidic-stream connection time, that is the connection time between the at least two HPLC columns and the pump, by controlling switching of any one or more of the downstream valve, a wash selection valve, and one or more three-way valve(s) distinct from the wash selection valve.

8. An automated LC method comprising fluidically connecting at least one HPLC column to a downstream valve in order to fluidically connect the at least one HPLC column to a detector via a valve-to-detector conduit, the method further comprising fluidically connecting a pump to the at least one HPLC column via the downstream valve in order to backflush and thereby clean the at least one HPLC column and fluidically connecting the pump to the valve-to-detector conduit via the downstream valve in order to wash the valve-to-detector conduit.

9. The LC method of claim 8, wherein the at least one HPLC column comprises at least two HPLC columns, the method further comprising alternately fluidically connecting the at least two HPLC columns to the valve-to-detector conduit via the downstream valve.

10. The LC method according to claim 8, comprising fluidically connecting the pump to the valve-to-detector conduit between two consecutive HPLC columns of the at least one HPLC column in order to wash liquid from a previous HPLC column out of the valve-to-detector conduit before liquid from a subsequent HPLC column enters the valve-to-detector conduit.

11. The LC method according to claim 8 comprising fluidically connecting the pump to the downstream valve via a wash selection valve, and alternately fluidically connecting the wash selection valve to the at least one HPLC column and to the valve-to-detector conduit via the downstream valve.

12. The LC method according to claim 11 comprising fluidically connecting the wash selection valve to the at least one HPLC column via a respective three-way valve fluidically connected to the downstream valve, the three-way valve comprising a wash-selection-valve inlet port, a downstream-valve outlet port, and a waste outlet port.

13. The LC method according to claim 8 comprising automatically backflushing the at least one HPLC column at regular intervals and/or upon detection of a pressure rise above a predetermined threshold in the at least one HPLC column and/or upon detection of performance reduction of the at least one HPLC column below a predetermined threshold.

14. The LC method according to claim 8 comprising automatically managing by a controller a fluidic-stream-to-detector connection time, that is the connection time between the at least one HPLC column and the valve-to-detector conduit, a pump-to-detector connection time, that is the connection time between the pump and the valve-to-detector conduit, and a pump-to-fluidic-stream connection time, that is the connection time between the at least one HPLC column and the pump, by controlling switching of any one or more of the downstream valve, a wash selection valve, and one or more three-way valve(s) distinct from the wash selection valve.

* * * * *